(12) United States Patent
Oppermann (10) Patent No.: US 7,701,998 B2
(45) Date of Patent: Apr. 20, 2010

(54) RADIO SIGNAL POSITIONING

(75) Inventor: Ian Oppermann, Espoo (FI)

(73) Assignee: SAAB AB, Linköping (SE)

( * ) Notice: Subject to any disclaimer, the term of this patent is extended or adjusted under 35 U.S.C. 154(b) by 487 days.

(21) Appl. No.: 10/595,368

(22) PCT Filed: Oct. 7, 2004

(86) PCT No.: PCT/SE2004/001431

§ 371 (c)(1),
(2), (4) Date: Oct. 18, 2007

(87) PCT Pub. No.: WO2005/039067

PCT Pub. Date: Apr. 28, 2005

(65) Prior Publication Data

US 2008/0089393 A1    Apr. 17, 2008

(30) Foreign Application Priority Data

Oct. 16, 2003    (EP) .................................. 03023369

(51) Int. Cl.
*H04B 1/00* (2006.01)

(52) U.S. Cl. .................. 375/141; 375/140; 375/147; 375/148; 375/150; 375/222

(58) Field of Classification Search ................. 375/141; 455/456.1

See application file for complete search history.

(56) References Cited

U.S. PATENT DOCUMENTS

| | | | |
|---|---|---|---|
| 5,179,573 A | 1/1993 | Paradise | |
| 6,028,883 A * | 2/2000 | Tiemann et al. | ............. 375/150 |
| 6,546,256 B1 | 4/2003 | Maloney et al. | |
| 6,639,939 B1 * | 10/2003 | Naden et al. | ................. 375/140 |

FOREIGN PATENT DOCUMENTS

| | | |
|---|---|---|
| EP | 1089452 A1 | 4/2001 |
| WO | WO 9103892 A1 | 3/1991 |

* cited by examiner

*Primary Examiner*—Shuwang Lui
*Assistant Examiner*—Dhaval Patel
(74) *Attorney, Agent, or Firm*—Venable LLP; Eric J. Franklin (57) ABSTRACT

Positioning of a mobile signal transmitter. A respective distance between the transmitter and each of a plurality of sensors is determined based on a direct sequence spread spectrum signal. A transmission delay of the signal is estimated with high accuracy by, in each sensor, cross-correlating an over-sampled representation of the signal with an appropriate local spreading sequence, which contains poly-phased symbol values being different from a set of symbols in the direct sequence used to spread the transmitted signal. The local spreading sequence has a nominal chip period, which is equivalent to the chip period of the over-sampled representation of the signal.

15 Claims, 4 Drawing Sheets

RADIO SIGNAL POSITIONING

THE BACKGROUND OF THE INVENTION AND PRIOR ART

The present invention relates generally to positioning of mobile units by means of radio signals. More particularly the invention relates to a method for determining a position of a signal transmitter, a sensor and a system. The invention also relates to a computer program and a computer readable medium.

In modern life there are many situations in which an accurate positioning of a mobile unit is desirable, for instance in applications concerning freight, transportation, logistics and surveillance or when tracking soldiers and vehicles in a combat training area. In the latter case, the tracking data thus generated may either be used for later simulation or for online monitoring purposes. In any case, due to the normally harsh operating conditions, it is important that the tracking system be robust and provides a high degree of freedom of movement for the personnel and vehicles carrying the tracking units.

Today, there are a number of alternative solutions for accomplishing positioning data in respect of a mobile unit, which is associated with an individual or a vehicle. A GNSS (Global Navigation Satellite System, of any type) can potentially provide a high accuracy for outdoor applications, at least in the order of 10 cm. However, since the GNSS requires a line of sight to multiple satellites, the system tends to be highly inaccurate in urban environments. Moreover, the system suffers serious performance degradation in the presence of radio channel multipath components.

An urban system or an indoor system may instead be based on the received signal strength of so-called radio propagation fingerprints. A calibrated systems based on such fingerprints may attain an accuracy of 1 m. However, the system requires that radio channel and strength measurements be made before the system is established, and its performance is highly environment specific. Moreover, the system suffers from significant inaccuracies whenever the radio conditions are altered, for example as a result of pedestrian traffic or a change in the room arrangement.

Alternatively, a highly accurate system may be built on the basis of frequency references. This type of systems namely allows a very high accuracy in fixed line-of-sight conditions. However, such systems are very expensive, require oscillators of exceptionally high accuracy both at the transmitter and the receiver end, and do not operate well in mobile environments. Furthermore, the design suffers from performance degradation in non-line-of-sight conditions.

It is also technically possible to accomplish positioning in a cellular infrastructure, such as that of a mobile telephone system. However, here the accuracy is limited to 10 m, or worse.

The U.S. Pat. No. 5,179,573 describes a system which utilizes a digital correlator to determine the time of arrival of a received pseudonoise signal. Based on the time of arrival, in turn, a distance to a signal transmitter may be estimated. The correlation is performed by means of a low-resolution correlator with a low complexity, wherein an incoming phase code pattern is matched against an internally stored phase code pattern. N-bit in-phase and quadrature phase values are used to detect the time of arrival of the received signal. However, although the correlation process is iterative by involving one amplitude detection step and at least one time-of-arrival detection step, the correlation performed is exclusively of auto-correlation type, i.e. a matching between the incoming signal and local copies in the receiver representing the possibly transmitted sequences. Since this requires an extensive over-sampling, the complexity of the iterative process proposed in the U.S. Pat. No. 5,179,573 increases very rapidly for each correlation iteration. Thus, in practice, an exceptionally large amount of processing power is required to attain a level of positioning accuracy, which is generally desired in many of today's urban and indoor applications.

SUMMARY OF THE INVENTION

The object of the present invention is therefore to provide a simple and robust radio positioning solution, which alleviates the above problems and thus offers output data whose accuracy can be made very high with a reasonable amount of processing.

According to one aspect of the invention the object is achieved by the position determining method as initially described, wherein the correlating step includes an over-sampling sub-step, a selecting sub-step and a cross-correlating sub-step. The over-sampling sub-step involves over-sampling the representation of the received signal, at least within the uncertainty region, to obtain a corresponding over-sampled representation of the received signal. This over-sampling is equivalent to the use of a reduced chip period, which is shorter than the nominal chip period. The selecting sub-step involves selecting a local spreading sequence, which contains poly-phased symbol values, i.e. non-binary values. The selected local spreading sequence has a nominal chip period, which also is equivalent to the reduced chip period. The cross-correlating sub-step involves correlating the over-sampled representation of the received signal with the selected local spreading sequence, such that an improved uncertainty region is obtained which is more limited than one half nominal chip period.

This method is advantageous because thereby a relatively high spatial resolution is accomplished in a comparatively simple and processing efficient manner. For instance, the properties of the channel need not be considered. Moreover, the correlation optimization technique does not require amplitude examination.

According to a preferred embodiment of this aspect of the invention, prior to said cross-correlating sub-step, the correlating step involves an auto-correlating sub-step. This step achieves a chip level synchronization within an uncertainty region of one half nominal chip period around an auto-correlation peak by correlating the representation of the received signal with a local copy of the transmitted spreading sequence. The auto-correlating sub-step is advantageous, since it renders it possible to reduce the size of a search window in which a more accurate delay parameter may be found. Thus, the processing efficiency can be further improved. Depending on which type of signal was transmitted, the local copy used in the auto-correlating sub-step may a binary (i.e. biphase) signal, a quaternary signal or other poly-phase signal.

According to yet another preferred embodiment of this aspect of the invention, the method involves the steps of examining a phase difference function, which describes a phase difference between neighboring samples in a cross-correlation function resulting from said cross-correlating sub-step; and detecting a position in the phase difference function where the phase difference between neighboring samples exceeds a predetermined magnitude. The improved uncertainty region is then defined adjacent to samples in the over-sampled representation of the received signal, which are equivalent to the detected position in the phase difference function. By selecting the poly-phased local spreading sequence appropriately said phase-difference change can be made very easy to detect, and consequently the definition of the search window can be made straightforward.

According to still another preferred embodiment of this aspect of the invention, sub-steps of over-sampling, selecting of a local spreading sequence and cross-correlating are repeated with progressively reduced chip periods and uncertainty regions until a desired limitation of the uncertainty region is achieved. A different local spreading sequence is here selected for each over-sampling of the representation of the received signal. Again, this strategy is desirable because a high accuracy is obtained very efficiently.

According to a further preferred embodiment of this aspect of the invention, the reduced chip period with respect to a first over-sampling represents an over-sampling by an integer factor larger than one of the received direct sequence spread spectrum signal. Any subsequent over-sampling after the first over-sampling then represents an even larger over-sampling factor than a foregoing over-sampling. Thereby, for each iteration, the resolution is increased efficiently at only a modest cost in terms of processing power. For example, a first over-sampling may be equivalent to a factor four, a second to a factor eight, and so on.

The over-sampling of the representation of the received signal may either involve a linear interpolation between neighboring sampling points, or involve one or more repetitions of each sampling value. The latter strategy is more preferable, since it generally provides a better result, and is less complex to perform.

According to a further aspect of the invention the object is achieved by a computer program, which is directly loadable into the internal memory of a computer, and includes software for controlling the above proposed method when said program is run on a computer.

According to another aspect of the invention the object is achieved by a computer readable medium, having a program recorded thereon, where the program is to control a computer to perform the above proposed method.

According to another aspect of the invention the object is achieved by a sensor as initially described, wherein the timing unit includes a sampling circuit, at least one bank of spreading sequences and a correlating circuit. The sampling circuit is adapted to over-sample the representation of the received signal, at least within the uncertainty region, and thereby produce a corresponding over-sampled representation of the received signal. The over-sampling is equivalent to the use of a reduced chip period, which is shorter than the nominal chip period. The at least one bank of spreading sequences is adapted to provide a local spreading sequence, which contains poly-phased symbol values being different from the set of symbols represented by the received signal. The local spreading sequence also has a nominal chip period which is equivalent to the reduced chip period. The correlating circuit is adapted to cross-correlate the over-sampled representation of the received signal with said local spreading sequence to obtain an improved uncertainty region being more limited than one half nominal chip period. A desirable feature of this sensor is that it enables a relatively high spatial resolution by means of simple and efficient hardware, which for instance, does not need to consider the properties of the channel.

According to a preferred embodiment of this aspect of the invention, the timing unit is adapted to, before cross-correlating the over-sampled representation of the received signal with said local spreading sequence, auto-correlate the representation of the received signal with a local copy of the transmitted spreading sequence from the at least one bank of spreading sequences, such that a chip level synchronization is obtained within an uncertainty region of one half nominal chip period around an auto-correlation peak. As mentioned above, such auto-correlation is advantageous because it facilitates an efficient reduction of a search window in which a more accurate delay parameter can be found.

According to a preferred embodiment of this aspect of the invention, the sensor includes a control circuit which is adapted to control the timing unit, such that for a particular representation of the received signal the at least one bank of spreading sequences provides an appropriate local spreading sequence to the correlating circuit. Thus, for each over-sampling, as well as for the initial band limited signal, correlation is performed between the representation of the received signal and a sequence which results in a high-quality estimation of the transmission delay. For example, a poly-phase sequence is selected whose resulting correlation function for a given over-sampling rate has a distinct phase-difference between consecutive values of the cross-correlation function.

According to another aspect of the invention the object is achieved by a system as initially described, wherein each of the sensors is a sensor of the above-proposed type. The advantages of the system according to the invention are apparent from the discussion hereinabove with reference to the proposed method and sensor.

The invention offers an excellent basis for providing an accurate, flexible and capable positioning system. For example, a positioning system designed according to the invention may cover a large number of buildings from a single location. Each of these buildings, in turn, may contain a very large number of separate rooms. Moreover, a positioning system based on the invention will be capable of handling a vast number of units (transmitters), which each is individually identifiable, has a low power consumption, and is small, lightweight, ruggedized as well as user safe. Such a system will be capable of providing a consistent accuracy and a high update frequency (i.e. number of measurements per unit). Furthermore, the invention renders it comparatively easy to provide real-time data, and the invention makes it possible for users/units to join and leave a measurement area at arbitrary times. Finally, provided adequate hardware, a system based on the invention will be capable of handing over to and from an external GNSS-based system, such as GPS (Global Positioning System, owned by the U.S. Department of Defense and operated by the Air Force Space Command).

Further advantages, advantageous features and applications of the present invention will be apparent from the following description and the dependent claims.

BRIEF DESCRIPTION OF THE DRAWINGS

The present invention is now to be explained more closely by means of preferred embodiments, which are disclosed as examples, and with reference to the attached drawings.

DESCRIPTION OF PREFERRED EMBODIMENTS OF THE INVENTION

Figure 1:
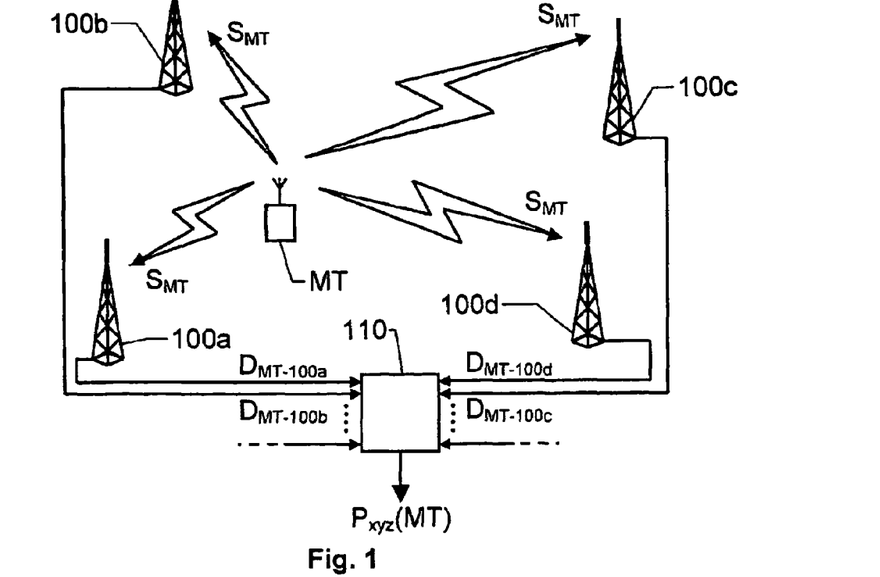
FIG. 1 depicts an example of a system according to a preferred embodiment of the invention.

A proposed system is shown in FIG. 1. Here, a transmitter MT (e.g. a uniquely identifiable unit attached to a soldier) is presumed to be located in an area where a signal $S_{MT}$ transmitted from the transmitter MT can be received by a plurality of sensors, say four, namely 100a, 100b, 100c and 100d respectively. The geographical position of each sensor is known with a high accuracy. According to a preferred embodiment of the invention, each of the sensors 100a, 100b, 100c and 100d determines a respective distance $D_{MT-100a}$, $D_{MT-100b}$, $D_{MT-100c}$ and $D_{MT-100d}$ to the transmitter MT based on a registered transmission delay of the signal $S_{MT}$. The distance data $D_{MT-100a}$-$D_{MT-100d}$ is then forwarded from the sensors 100a, 100b, 100c and 100d to a central node 110, where the data is collected and used to calculate the transmitter's MT position by means of triangulation or similar technique, and with reference to the positions of the sensors 100a, 100b, 100c and 100d. Generally, the transmitter's MT position may be estimated more accurately if a large number of sensors are involved. Nevertheless, the signal $S_{MT}$ must be received by at least three different sensors to enable determination of a two-dimensional position, and by at least four sensors to render three-dimensional position data $P_{xyz}(MT)$ possible.

Figure 2:
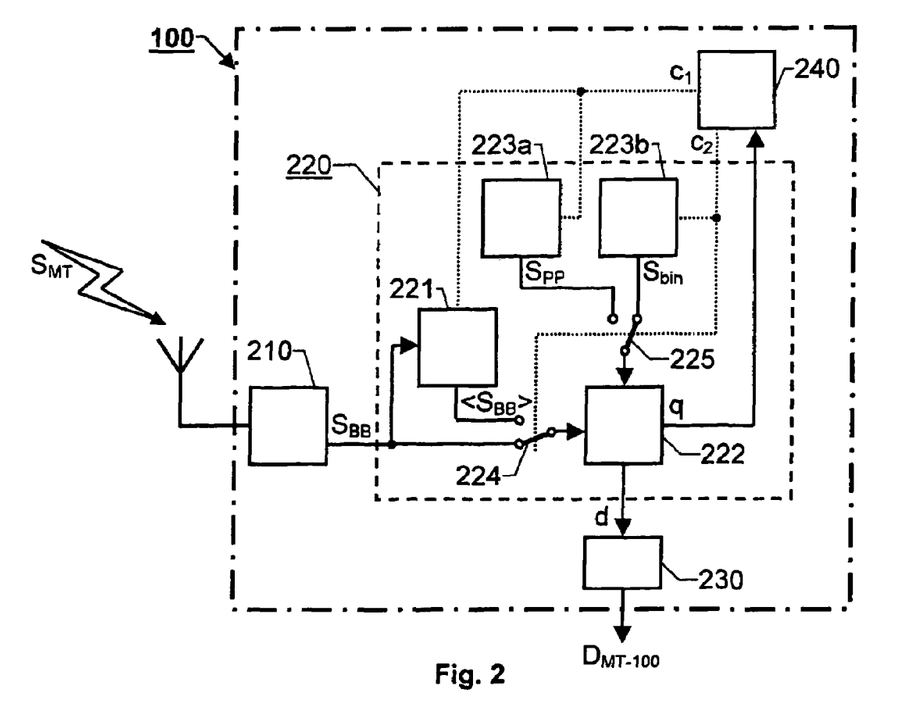
FIG. 2 shows a block diagram over a sensor according to a preferred embodiment of the invention.

FIG. 2 shows a block diagram over a sensor 100 according to a preferred embodiment of the invention, which is adapted to determine a distance $D_{MT-100}$ to a signal transmitter, such as MT in FIG. 1, based on a direct sequence spread spectrum signal $S_{MT}$ (e.g. binary or poly-phase) received from the transmitter. The sensor 100 includes a front end unit 210, a timing unit 220, a calculating circuit 230 and a control circuit 240.

The front end unit 210 is adapted to receive the signal $S_{MT}$ in the form of a propagated radio signal and deliver a band limited and time discrete representation thereof $S_{BB}$, which is sampled to fulfill the requirements of the Nyquist theorem.

The timing unit 220 is adapted to receive the representation $S_{BB}$ of the signal $S_{MT}$, and based thereon, estimate a transmission delay d of the signal $S_{MT}$. More specifically, the timing unit 220 determines the transmission delay d on the basis of a cross-correlation between at least one over-sampled representation $<S_{BB}>$ of the received signal $S_{MT}$ and at least one locally stored spreading sequence $S_{PP}$, which contains poly-phased symbol values.

The calculating circuit 230 receives the transmission delay value d from the timing unit 220 and transforms this data into a corresponding distance $D_{MT-100}$ between the transmitter, say MT in FIG. 1, and the sensor 100.

The control circuit 240 is adapted to control the timing unit 220 such that a particular over-sampled representation $<S_{BB}>$ of the received signal $S_{MT}$ is correlated with an appropriate local spreading sequence $S_{PP}$. Preferably, repeated cross-correlations are performed between various over-sampled representations $<S_{BB}>$ and local spreading sequences $S_{PP}$ until a desired delay (/distance) resolution is obtained. A quality parameter q is fed back from the timing unit 220 to the control circuit 240 to indicate a current resolution, or timing accuracy of the received signal $S_{MT}$.

According to a preferred embodiment of the invention, the timing unit 220 includes a sampling circuit 221, two banks of spreading sequences 223a and 223b, and a correlating circuit 222. The control circuit 240 and the timing unit 220 interact according to the following. Initially, the basic representation $S_{BB}$ of the received signal $S_{MT}$ is fed to the correlating circuit 222 together with a local copy $S_{bin}$ of the (presumably) transmitted spreading sequence. The local copy $S_{bin}$ is retrieved from a first bank of spreading sequences 223b. The correlating circuit 222 correlates the signals $S_{BB}$ and $S_{bin}$ with one another (i.e. essentially performs an auto-correlation operation), and a corresponding transmission delay value d and quality parameter q are produced. Provided that the transmitted spreading sequence has a particular nominal chip period, the quality parameter q would, after this correlation, typically indicate a chip level synchronization within an uncertainty region of one half nominal chip period around an auto-correlation peak in the resulting function (see 501 in FIG. 5).

If the control circuit 240 finds this degree of synchronization insufficient, it controls the timing unit 220 to perform at least one additional correlation operation. This time, a first control signal $c_1$ from the control circuit 240 instructs the sampling circuit 221 to over-sample the basic representation $S_{BB}$ of the received signal $S_{MT}$, at least within the above-mentioned uncertainty region, and (at least with respect to this region) produce a corresponding over-sampled representation $<S_{BB}>$, say equivalent to an over-sampling by a factor four. However, any integer larger than one is equally well conceivable. In any case, the chip period here becomes shorter than the nominal chip period.

A second control signal $c_2$ from the control circuit 240 instructs a second bank of spreading sequences 223a to deliver a local spreading sequence $S_{PP}$ containing poly-phased symbol values.

The second control signal $c_2$ also activates a pair of switches 224 and 225, such that the over-sampled representation $<S_{BB}>$ and the local spreading sequence $S_{PP}$ are fed to the correlating circuit 222. Thus, this time, the correlating circuit 222 instead cross-correlates the over-sampled representation $<S_{BB}>$ of the received signal $S_{MT}$ with the selected local spreading sequence $S_{PP}$. As mentioned earlier, given an appropriate local spreading sequence $S_{PP}$ the result of the latter correlation improves the resolution, such that the uncertainty region becomes more limited than one half nominal chip period. This is also reflected by an updated quality parameter q.

Naturally, if required, the control circuit 240 may instruct the sampling circuit 221 to deliver another over-sampled representation $<S_{BB}>$ of the received signal $S_{MT}$ (having a yet higher sampling rate) and instruct the second bank of spreading sequences 223a to deliver a different local spreading sequence $S_{PP}$ of poly-phased symbol values (which is appropriate with respect to said higher sampling rate), and repeat the cross-correlation. Such iteration may then be repeated until a satisfying resolution is obtained.

In any case, the control circuit 240 is adapted to control the timing unit 220 such that for a particular representation $S_{BB}$ or $<S_{BB}>$ of the received signal $S_{MT}$ one of the banks of spreading sequences 223a or 223b provide an appropriate local spreading sequence $S_{PP}$ or $S_{bin}$ respectively to the correlating circuit 222.

Although the operating principle of the sensor 100, which is described above implies that an auto-correlation be performed before any cross-correlation is executed, the auto-correlation step may be omitted. However, the initial uncertainty region then typically becomes larger than one half nominal chip period.

Figure 3:
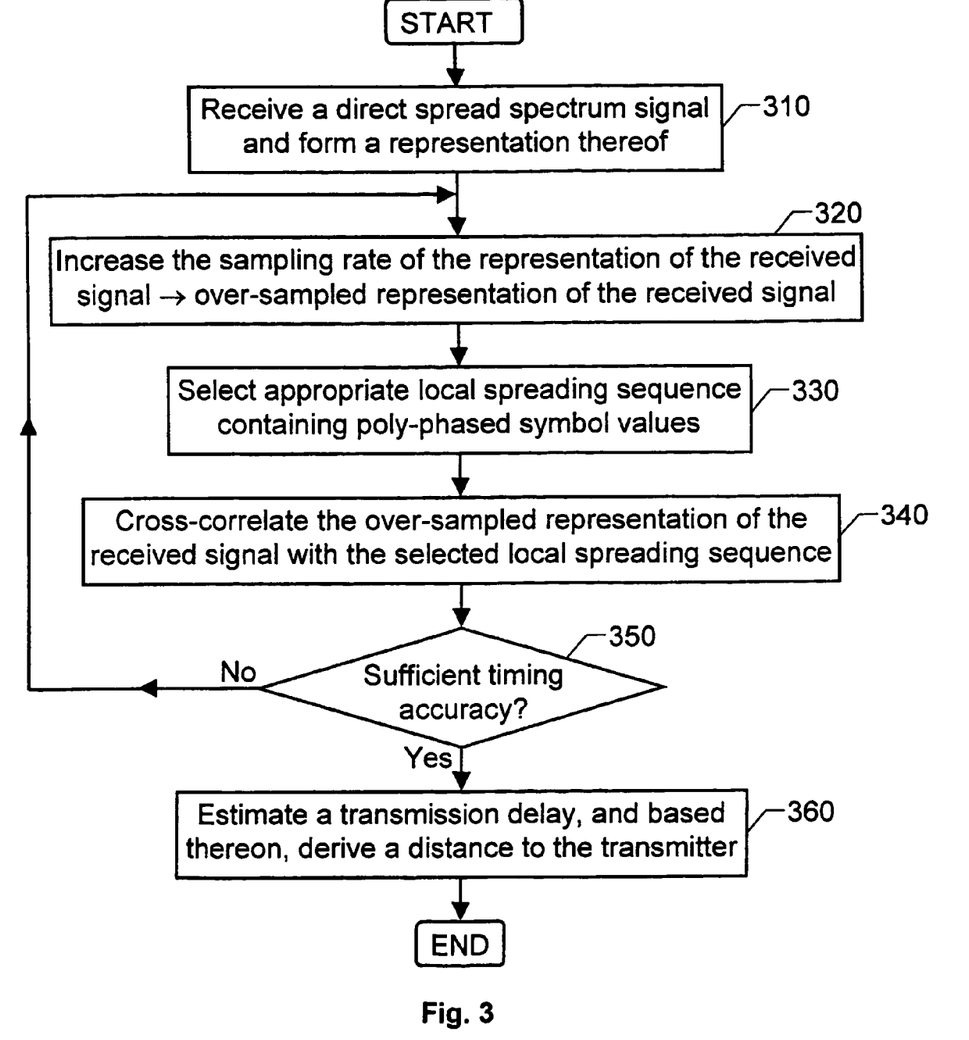
FIG. 3 illustrates, by means of a flow-diagram, a general method for deriving a distance between a signal transmitter and a signal receiver according to the invention.

The general method for deriving a distance between a signal transmitter and a signal receiver according to the invention will now be described with reference to a flow diagram in FIG. 3.

A first step 310 receives a direct spread spectrum signal, which has been transmitted from a unit within the system, for instance the transmitter MT in FIG. 1. As mentioned previously, the transmitted signal may have any type of format, such as binary, quaternary or poly-phase. The step 310 also forms a representation of the received signal, for example by subjecting it to baseband sampling and filtering.

A subsequent step 320 increases the sampling rate of the representation of the received signal. In a first run-through of the procedure this increase is typically equivalent to an over-sampling by a factor four. However, again, any integer larger than one is conceivable. The over-sampling produces an over-sampled representation of the representation of the received signal.

Then, a step 330 selects an appropriate local spreading sequence that contains poly-phased symbol values, which are different from the set of symbols in the sequence used to spread the transmitted signal. A particular local spreading sequence is considered to be appropriate if it produces a cross-correlation result together with the current over-sampled representation of the received signal, which has a distinct phase-difference change within a relatively narrow search window. Thus, the appropriate local spreading is not (necessarily) unique. Instead, a plurality of local spreading sequences may very well be appropriate, however more or less ideal.

After that, step 340 performs a cross-correlation operation between the over-sampled representation of the received signal and the selected local spreading sequence. As a result, for example phase data are produced (a phase function and/or a phase difference function). Step 350 examines whether it is possible to attain sufficient timing accuracy from the cross-correlation function and its associated phase data. If such an accuracy can be achieved on the basis of the latest performed correlation, the procedure continues to step 360. Otherwise, the procedure loops back to the step 320 in order to further increase the oversampling rate.

The step 360 estimates a transmission delay based on the cross-correlation performed in the step 340. On further basis of the transmission delay a distance between the transmitter and the receiver is derived. Finally, this distance may be used as an input parameter when determining the transmitter's position. However, in order to determine a two-dimensional coordinate (e.g. represented by a geographical longitude and a latitude), the transmitted signal must be received in at least three different sensors; and in order to determine a three-dimensional coordinate (e.g. represented by a geographical longitude and a latitude plus an altitude) the transmitted signal must be received by at least four different sensors.

All of the process steps, as well as any sub-sequence of steps, described with reference to the FIG. 3 above may be controlled by means of a programmed computer apparatus, preferably located in the proposed sensor. Moreover, although the embodiments of the invention described above with reference to the drawings comprise computer apparatus and processes performed in computer apparatus, the invention thus also extends to computer programs, particularly computer programs on or in a carrier, adapted for putting the invention into practice. The program may be in the form of source code, object code, a code intermediate source and object code such as in partially compiled form, or in any other form suitable for use in the implementation of the process according to the invention. The carrier may be any entity or device capable of carrying the program. For example, the carrier may comprise a storage medium, such as a ROM (Read Only Memory), for example a CD (Compact Disc) or a semiconductor ROM, or a magnetic recording medium, for example a floppy disc or hard disc. Further, the carrier may be a transmissible carrier such as an electrical or optical signal which may be conveyed via electrical or optical cable or by radio or by other means. When the program is embodied in a signal which may be conveyed directly by a cable or other device or means, the carrier may be constituted by such cable or device or means. Alternatively, the carrier may be an integrated circuit in which the program is embedded, the integrated circuit being adapted for performing, or for use in the performance of, the relevant processes.

Figure 4:
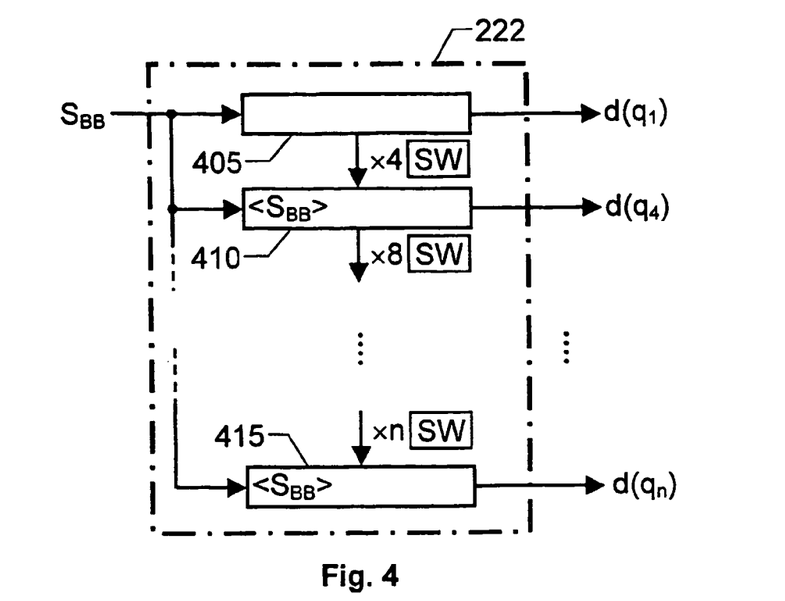
FIG. 4 shows a block diagram over a correlating circuit according to a preferred embodiment of the invention.

FIG. 4 shows a block diagram over a correlating circuit 222 according to a preferred embodiment of the invention. The correlating circuit 222 includes a conventional correlator 405 adapted to perform auto-correlation operations with regard to a basic representation $S_{BB}$ of the received signal. The correlating circuit 222 also contains at least one over-sampling correlator 410-415 adapted to perform cross-correlation operations with regard to over-sampled representations $<S_{BB}>$ of the received signal. Each correlator 405-415 produces a delay value d and a respective quality measure $q_1$, $q_4$ up to $q_n$. Moreover, according to this embodiment, a relevant over-sampling is accomplished within each over-sampling correlator 410-415. Thus, here the sampling circuit 221 of FIG. 2 is distributed inside the correlating circuit 222.

A first over-sampling correlator 410 represents an integer over-sampling larger than one (say four) of the representation $<S_{BB}>$ of the transmitted direct sequence spread spectrum signal. Preferably, each subsequent over-sampling correlator up to the final correlator 415 after the first over-sampling represents an increased over-sampling by an integer factor (e.g. two) times a foregoing over-sampling. Consequently, the over-sampling correlators 410-415 may represent the over-sampling factors 4, 8, 16, 32, 64 etc up to n. A corresponding search window SW to be applied on each cross-correlation result is also illustrated in the FIG. 4.

Figure 5:
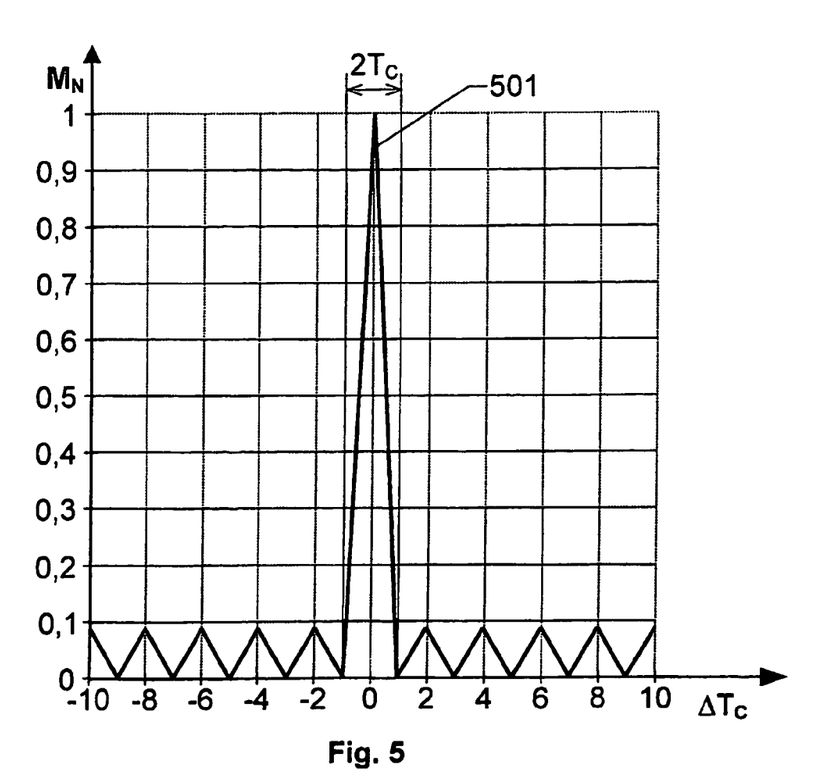
FIG. 5 shows a diagram illustrating an idealized auto-correlation function of a spreading sequence.

FIG. 5 shows a diagram illustrating an auto-correlation function of an 11 chip binary Barker sequence, which may be used as a spreading sequence according to the invention. Although according to the invention, essentially any alternative spreading sequence of any other length and format may also be used, the 11 chip binary Barker sequence is advantageous because it has good auto-correlation properties for conventional peak amplitude delay estimation. Moreover, it has the property of producing a relatively constant reception of successive identical symbols.

The x-axis indicates a shift $\Delta T_C$ expressed in chip periods $T_C$, and the y-axis shows a normalized magnitude $M_N$. Of course, the function has a peak 501 (with a normalized magnitude value $M_N=1$) at zero shift (i.e. $\Delta T_C=0$). For all other shifts $\Delta T_C$ (i.e. the side lobes) the normalized magnitude $M_N$ is relatively low. The peak 501 is 2 $T_C$ wide, which means that an actual delay value for the received signal is to be found within an uncertainty region of one half chip period $T_C/2$ from the peak 501.

Figure 6:
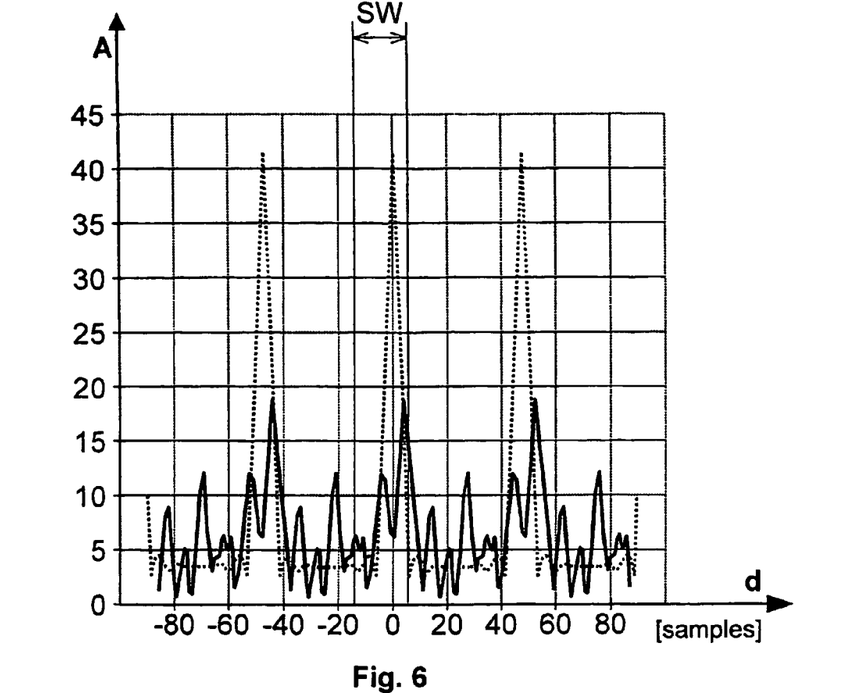
FIG. 6 shows a diagram which exemplifies an auto-correlation function of a spreading sequence and a cross-correlation function between such a spreading sequence and a proposed poly-phase sequence suitable to determine an improved transmission delay parameter according to a preferred embodiment of the invention.

FIG. 6 shows a diagram which exemplifies an auto-correlation function of a spreading sequence [dotted line] (here a four times over-sampled 11 chip binary Barker sequence); and a cross-correlation function between such a sequence and a proposed poly-phase sequence [solid line], which is suitable to determine an improved transmission delay parameter according to a preferred embodiment of the invention. The x-axis indicates a delay d expressed in a number of samples from a central auto-correlation peak (at d=0), and the y-axis shows absolute amplitude A. A 2 $T_C$-wide search window SW is illustrated, which overlaps the central auto-correlation peak and within which the actual delay value lies. As can be seen, the auto-correlation function has three (identical) symbols. Therefore, the function has three distinct peaks at d≈−48, d=0 and d≈48 respectively, and for all other values (i.e. between these peaks) the auto-correlation function has relatively low values. This makes it comparatively uncomplicated to detect the peaks. Moreover, averaging over several symbols is facilitated. Naturally, any number of consecutive identical symbols (other than the three symbols illustrated in FIG. 6) may also be transmitted. In fact, a relatively large number of such symbols are desired because then a greater degree of averaging can be performed, and the performance in the presence may be improved.

It should be noted that the magnitude of the cross-correlation function at the correct delay must be reasonably large in order to obtain an acceptable performance in the presence of noise.

Figure 7A:
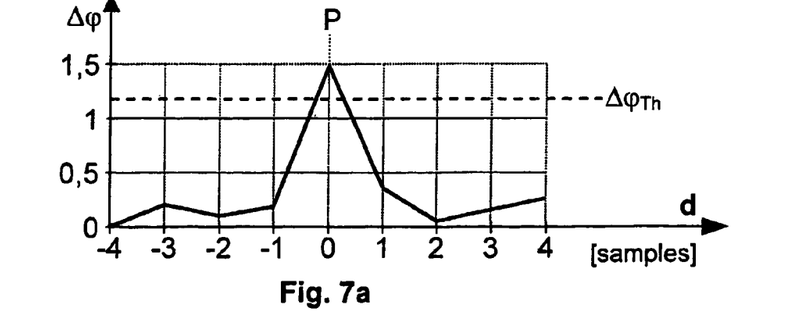
FIGS. 7a-b show diagrams which illustrate examples of a phase difference between the auto-correlation function and the cross-correlation function in FIG. 6, respective an absolute phase of said cross-correlation function.

FIG. 7a shows a diagram which illustrates the phase difference Δφ between the auto-correlation and cross-correlation functions of FIG. 6. The x-axis indicates a delay d expressed in a number of samples from the auto-correlation peak (d=0), and the y-axis shows the phase difference A(p expressed in radians. An appropriate poly-phase sequence results in a relatively large phase difference in proximity to the auto-correlation peak (i.e. for d=0) of approximately Δφ=1.5 radians, typically π/2. The theoretically largest peak value, however, is π.

Figure 7B:
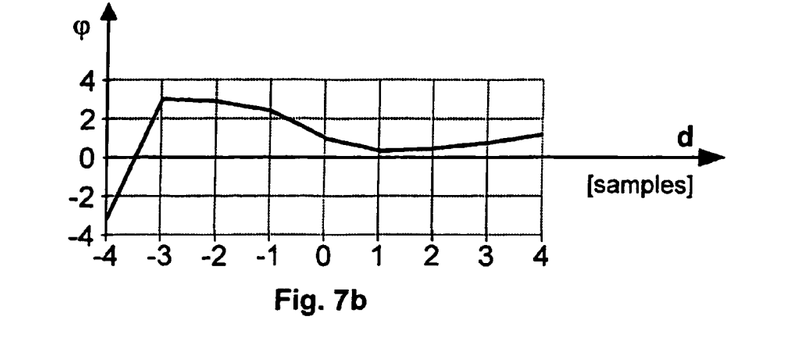

FIG. 7b shows a diagram, which along the y-axis illustrates an absolute phase angle φ (in radians) of the cross-correlation function in FIG. 6. The x-axis again indicates a delay d expressed in a number of samples from the auto-correlation peak (d=0). As can be seen, the phase angle φ varies most between d=−1 and d=0. This is an indication that the actual delay value is likely to be located at d=−1, or at d=0. Thus, an improved uncertainty region associated with the current over-sampling rate (and reduced chip period) should be defined over d=−1 (or possibly d=0). It should be noted that the apparently large difference in the phase value between d=−4 and d=−3 simply depends on the selected reference angle. Namely, φ=π is the same as φ=−π.

The term "comprises/comprising" when used in this specification is taken to specify the presence of stated features, integers, steps or components. However, the term does not preclude the presence or addition of one or more additional features, integers, steps or components or groups thereof.

The invention is not restricted to the described embodiments in the figures, but may be varied freely within the scope of the claims.

The invention claimed is:

1. A method for determining a position of a signal transmitter, the method comprising:
   receiving a direct sequence spread spectrum signal from the transmitter in each of at least three physically separated sensors whose respective positions are known, the signal representing a set of symbols,
   correlating, in each of the sensors a representation of the received signal with at least one local spreading sequence to determine a respective estimated transmission delay of the received signal, the received direct sequence spread spectrum signal having a nominal chip period, the correlating producing a chip level synchronization at least within an uncertainty region of one half nominal chip period, and
   calculating a distance between the signal transmitter and each of the at least three sensors based on the respective estimated transmission delays,
   wherein the correlating further comprises:
   over-sampling the representation of the received signal within the uncertainty region to obtain a corresponding over-sampled representation of the received signal, the over-sampling being equivalent to a reduced chip period which is shorter than the nominal chip period,
   selecting a local spreading sequence containing poly-phased symbol values which are different from the set of symbols represented by the received signal, the selected local spreading sequence having a nominal chip period being equivalent to the reduced chip period, and
   cross-correlating the over-sampled representation of the received signal with the selected local spreading sequence to obtain an improved uncertainty region which is more limited than one half nominal chip period.

2. The method according to claim 1, wherein prior to said cross-correlating, the correlating further comprises an auto-correlating wherein the representation of the received signal is correlated with a local copy of the transmitted spreading sequence to provide an uncertainty region of one half nominal chip period around an auto-correlation peak.

3. The method according to claim 1, further comprising:
   examining a phase difference function which describes a phase difference between neighboring samples in a cross-correlation function resulting from said cross-correlating,
   detecting a position in said phase difference function where the phase difference between neighboring samples exceeds a predetermined magnitude, and
   defining the improved uncertainty region adjacent to samples in the over-sampled representation of the received signal equivalent to said position.

4. The method according to claim 1, wherein the improved uncertainty region has an extension which is equal to one half reduced chip period.

5. The method according to claim 1, wherein the over-sampling, the selecting a local spreading sequence, and the cross-correlating are repeated with progressively reduced chip periods and uncertainty regions until a desired limitation of the uncertainty region is achieved.

6. The method according to claim 5, wherein the reduced chip period with respect to a first over-sampling represents an over-sampling by an integer factor of the transmitted direct sequence spread spectrum signal, said integer factor being larger than one.

7. The method according to claim 6, wherein the reduced chip period with respect to any subsequent over-sampling after the first over-sampling represents an integer factor times a foregoing over-sampling, said integer factor being larger than one.

8. The method according to claim 1, wherein the over-sampling comprises a linear interpolation between neighboring sampling points.

9. The method according to claim 1, wherein the over-sampling comprises one or more repetitions of each sampling value.

10. A computer program encoded into a non-transitory computer readable medium, comprising:
    program code for determining a position of a signal transmitter, the program code comprises sets of instructions for:

receiving a direct sequence spread spectrum signal from the transmitter in each of at least three physically separated sensors whose respective positions are known, the signal representing a set of symbols, correlating, in each of the sensors a representation of the received signal with at least one local spreading sequence to determine a respective estimated transmission delay of the received signal, the received direct sequence spread spectrum signal having a nominal chip period, the correlating step producing a chip level synchronization at least within an uncertainty region of one half nominal chip period, and calculating a distance between the signal transmitter and each of the at least three sensors based on the respective estimated transmission delays, wherein the correlating further comprises:

over-sampling the representation of the received signal within the un-certainty region to obtain a corresponding over-sampled representation of the received signal, the over-sampling being equivalent to a reduced chip period which is shorter than the nominal chip period, selecting a local spreading sequence containing poly-phased symbol values which are different from the set of symbols represented by the received signal, the selected local spreading sequence having a nominal chip period being equivalent to the reduced chip period, and cross-correlating the over-sampled representation of the received signal with the selected local spreading sequence to obtain an improved uncertainty region which is more limited than one half nominal chip period.

11. A non-transitory computer readable medium, having a program code recorded thereon, wherein the program code includes sets of instructions comprising:

first computer instructions for receiving a direct sequence spread spectrum signal from the transmitter in each of at least three physically separated sensors whose respective positions are known, the signal representing a set of symbols, second computer instructions for correlating, in each of the sensors a representation of the received signal with at least one local spreading sequence to determine a respective estimated transmission delay of the received signal, the received direct sequence spread spectrum signal having a nominal chip period, the correlating step producing a chip level synchronization at least within an uncertainty region of one half nominal chip period, and third computer instructions for calculating a distance between the signal transmitter and each of the at least three sensors based on the respective estimated transmission delays, wherein the correlating further comprises:

forth computer instructions for over-sampling the representation of the received signal within the uncertainty region to obtain a corresponding over-sampled representation of the received signal, the over-sampling being equivalent to a reduced chip period which is shorter than the nominal chip period, fifth computer instructions for selecting a local spreading sequence containing poly-phased symbol values which are different from the set of symbols represented by the received signal, the selected local spreading sequence having a nominal chip period being equivalent to the reduced chip period, and sixth computer instructions for cross-correlating the over-sampled representation of the received signal with the selected local spreading sequence to obtain an improved uncertainty region which is more limited than one half nominal chip period.

12. A sensor for determining a distance to a signal transmitter based on a direct sequence spread spectrum signal received from the transmitter, the signal representing a set of symbols, the sensor comprising:

a timing unit adapted to determine an estimated transmission delay of the received signal based on a correlation between at least one representation of the received signal and at least one local spreading sequence, the received direct sequence spread spectrum signal having a nominal chip period, the timing unit being adapted to produce a chip level synchronization at least within an uncertainty region of one half nominal chip period, and a calculating circuit adapted to calculate the distance based on the transmission delay produced by said timing unit, wherein the timing unit comprises:

a sampling circuit adapted to over-sample the representation of the received signal within the uncertainty region to produce a corresponding over-sampled representation of the received signal, the over-sampling being equivalent to a reduced chip period which is shorter than the nominal chip period, at least one bank of spreading sequences adapted to provide a local spreading sequence containing poly-phased symbol values which are different from the set of symbols represented by the signal, said local spreading sequence having a nominal chip period which is equivalent to the reduced chip period, and a correlating circuit adapted to cross-correlate the over-sampled representation of the received signal with said local spreading sequence to obtain an improved uncertainty region being more limited than one half nominal chip period.

13. The sensor according to claim 12, wherein the timing unit is adapted to, before cross-correlating the over-sampled representation of the received signal with said local spreading sequence, auto-correlate the representation of the received signal with a local copy of the transmitted spreading sequence from the at least one bank of spreading sequences such that a chip level synchronization is obtained within an uncertainty region of one half nominal chip period around an auto-correlation peak.

14. The sensor according to claim 12, further comprising:

a control circuit adapted to control the timing unit such that for a particular representation of the received signal the at least one bank of spreading sequences provides an appropriate local spreading sequence to the correlating circuit.

15. A system for determining a position of a signal transmitter transmitting a direct sequence spread spectrum signal, the system comprising:

at least three physically separated sensors, each sensor being adapted to receive the signal transmitted from the signal transmitter, the respective position of each sensor being known, and a central node adapted to receive distance data from each of the sensors, the distance data representing a respective distance between the transmitter and the sensor, wherein each of the sensors comprises:

a timing unit adapted to determine an estimated transmission delay of the received signal based on a correlation between at least one representation of the received signal and at least one local spreading sequence, the received direct sequence spread spectrum signal having a nominal chip period, the timing unit being adapted to produce a chip level synchronization at least within an uncertainty region of one half nominal chip period, and a calculating circuit adapted to calculate the distance based on the transmission delay produced by said timing unit, wherein the timing unit comprises:

a sampling circuit adapted to over-sample the representation of the received signal within the uncertainty region to produce a corresponding over-sampled representation of the received signal, the over-sampling being equivalent to a reduced chip period which is shorter than the nominal chip period, at least one bank of spreading sequences adapted to provide a local spreading sequence containing poly-phased symbol values which are different from the set of symbols represented by the signal, said local spreading sequence having a nominal chip period which is equivalent to the reduced chip period, and a correlating circuit adapted to cross-correlate the over-sampled representation of the received signal with said local spreading sequence to obtain an improved uncertainty region being more limited than one half nominal chip period.

* * * * *